(No Model.) 3 Sheets—Sheet 1.
J. KAYLOR.
HAY RAKE AND LOADER.
No. 556,353. Patented Mar. 17, 1896.
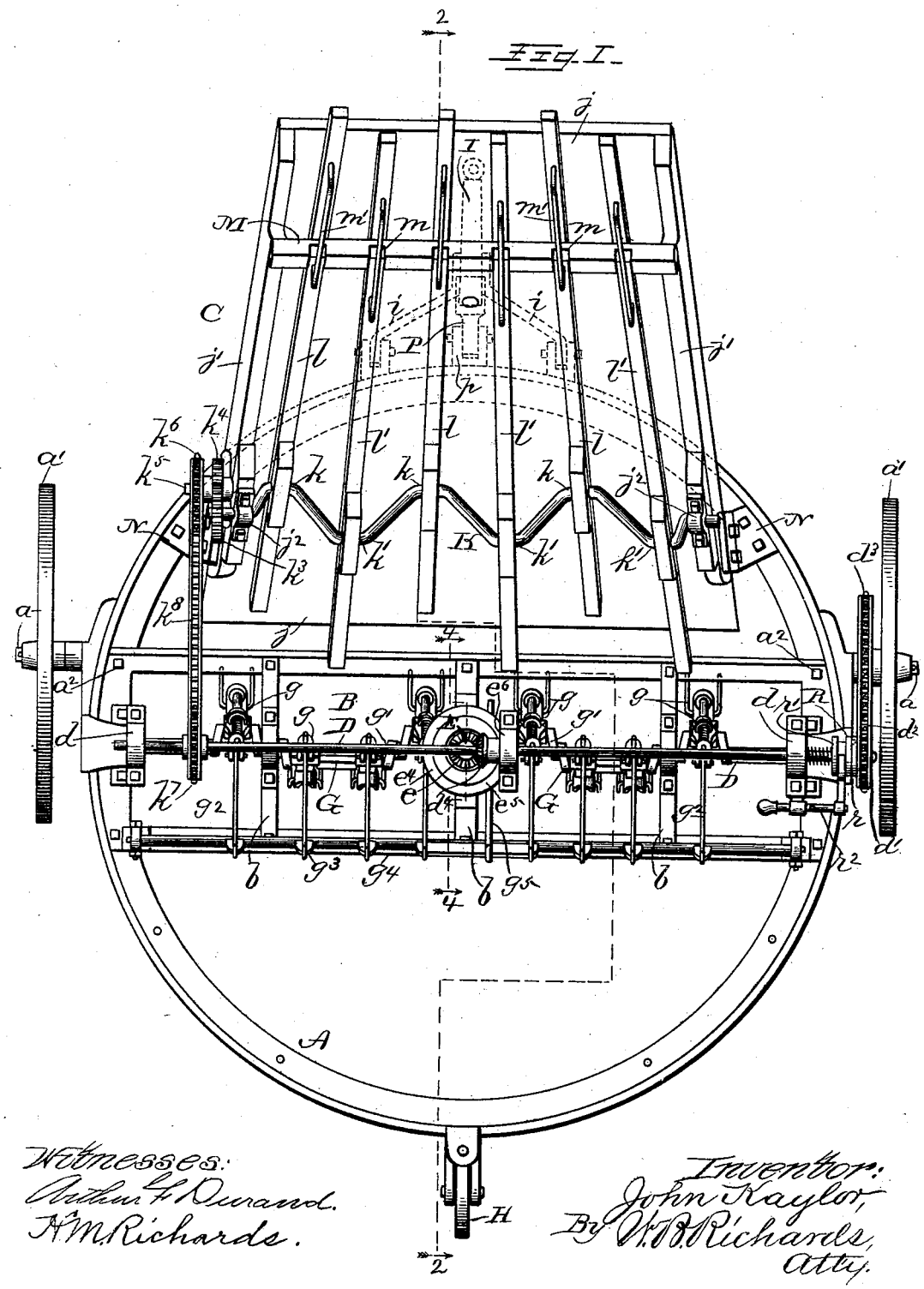
Witnesses:
Arthur F. Durand.
H. M. Richards.
Inventor:
John Kaylor,
By W. W. Richards,
Atty.

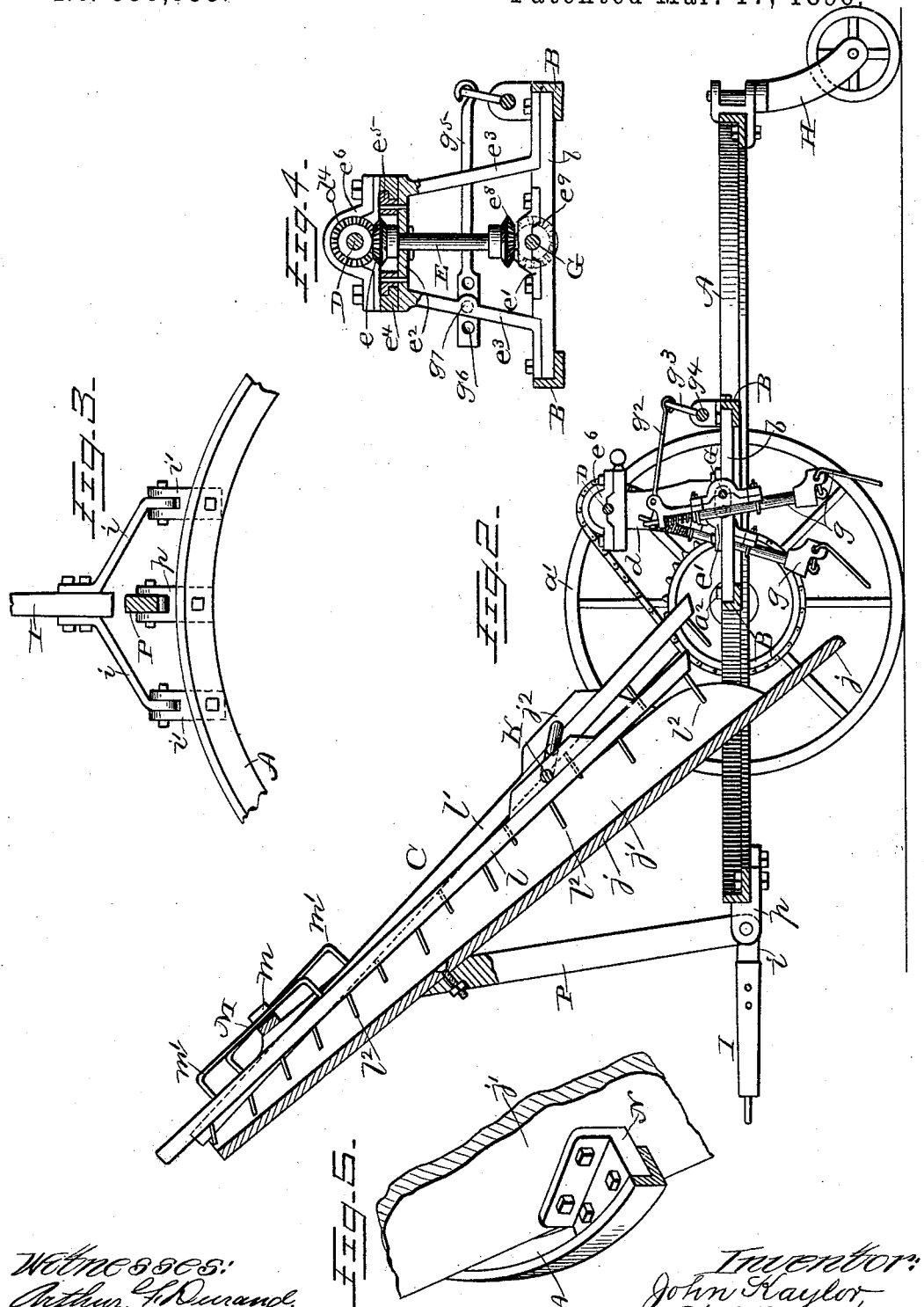

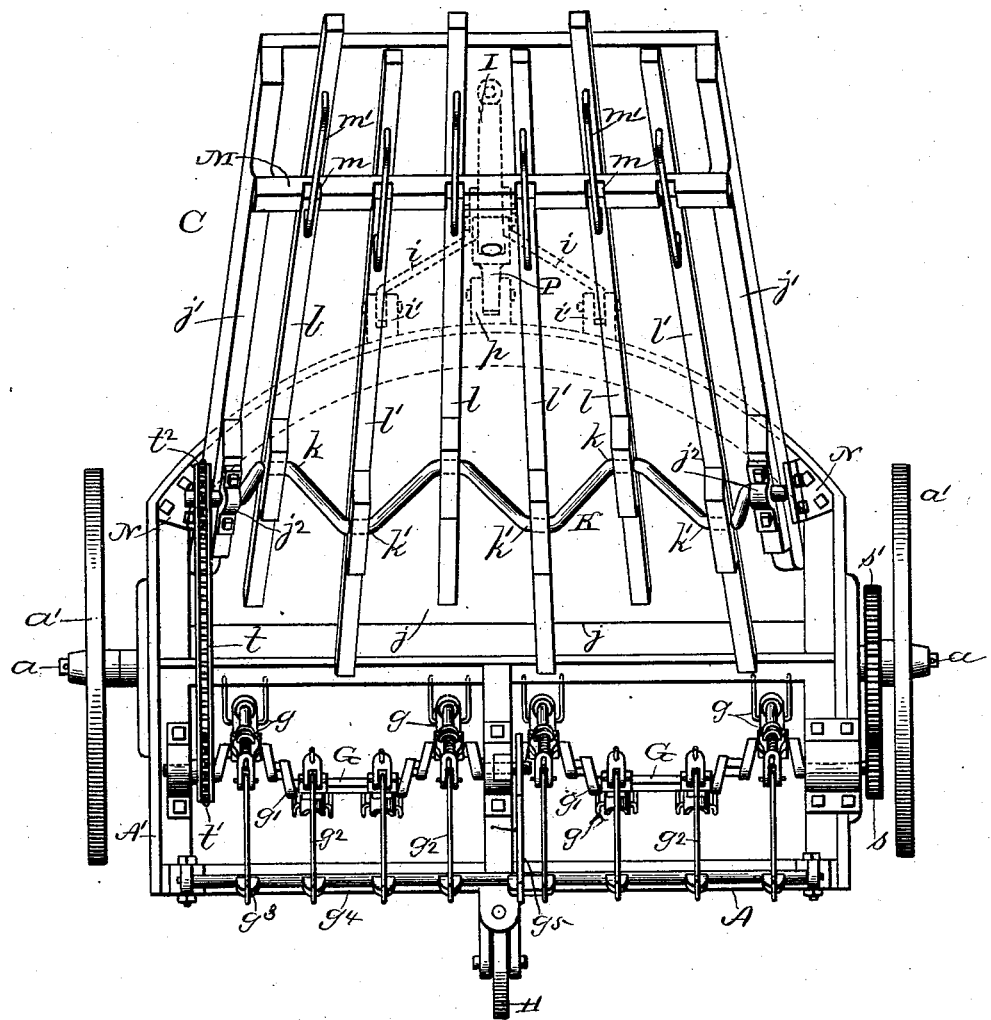

UNITED STATES PATENT OFFICE.

JOHN KAYLOR, OF DECATUR, ILLINOIS, ASSIGNOR OF ONE-THIRD TO THE CHAMBERS, BERING, QUINLAN COMPANY, OF SAME PLACE.

HAY RAKE AND LOADER.

SPECIFICATION forming part of Letters Patent No. 556,353, dated March 17, 1896.

Application filed April 27, 1895. Serial No. 547,348. (No model.)

*To all whom it may concern:*

Be it known that I, JOHN KAYLOR, a citizen of the United States, residing at Decatur, in the county of Macon and State of Illinois, have invented certain new and useful Improvements in Hay Rakes and Loaders, of which the following is a specification.

Machines designed to rake or collect hay from the swath or from windrows, and continuously, as raked, to elevate and deliver it onto a wagon or other receiver, and which have gone into use to any practical extent, may be divided into two general classes, in one of which classes the hay raking and elevating mechanism consists of endless belts with projecting teeth adapted to act as hay rakes or gatherers and as hay-elevators, and in the other of which classes the raking and elevating mechanism consists of a series of endlong reciprocating bars, or gangs of such bars, located over and underlying inclined platform or floor, which reciprocating bars are provided with teeth on their lower sides and are operated by a multicrank shaft for both raking and elevating the hay.

In some of the machines of both classes referred to above, as shown in certain patents and as manufactured, additional mechanism for raking and collecting the hay has been provided, which additional mechanism or after-rake follows in rear of endless hay-elevating belts, a typical machine of which class is shown in Letters Patent No. 357,446, issued to Bader and Bader February 8, 1887, and also which after-rakes follow in rear of endlong reciprocating bars overlying a platform or frame, a typical machine of which class is shown and described in Letters Patent No. 137,751, issued to Davidson and Parvis April 8, 1873, in which patent, and as also shown in other patents, said after-rake consists of a toothed roller, and still other devices.

I am not aware, prior to my invention, of any patent showing, or of any public use or manufacture of a machine having, a series of rakes following a series of or gangs of endlong reciprocating hay-elevating bars, the rakes of which series of after-rakes have a reversed or forward tedder-fork action, whereby they rake the hay and continuously, as it is raked, toss or lift it and throw it forwardly and upwardly between the lower end of the underlying platform or floor and the overlying reciprocating hay-elevating bars, where it will be caught by the teeth on the hay-elevating bars of the loader, and by them be carried or impelled upwardly over the underlying platform or floor, which floor extends sufficiently beyond and below the lower ends of the reciprocating rake-bars to receive the hay as it is delivered from the tedder-forks, and form a way on which it passes into reach of the teeth on the reciprocating hay-elevating bars; and a leading object of my invention is to provide a rake and loader of the kind last described in which a new combination is introduced, wherein the parts have a new collective mode of operation, productive of a new result or effect and a materially better effect than attained by previous constructions of hay-loaders with after-rakes.

Other objects of my invention are hereinafter described, and the constructions and combinations with their modes of operation evolved in carrying out the different objects of my invention, and in which constructions and combinations my improvements consist, are also hereinafter described and made the subject-matter of claims hereto appended.

Mechanism embodying the preferred constructive forms of and showing the mutual relationship and combinations of the parts forming the subject-matter of my improvements, embodied in the best form at present known to me, is illustrated in the accompanying drawings, in which—

Figure 1 is a top plan of a hay rake and loader embodying my improvements; Fig. 2, a sectional elevation in the line 2 2 in Fig. 1, showing two of the after-rakes for raking and tossing the hay upwardly and forwardly and two of the hay-elevating bars; Fig. 3, an enlarged top plan of the forward part of the ring-shaped or annular carrying-frame of Fig. 1. Fig. 4 is a sectional elevation of parts in the line 4 4 in Fig. 1; Fig. 5, an enlarged perspective showing adjacent fragmentary parts of the carrying-frame and elevator-frame and of one of the clamps for fixing them to each other; Fig. 6, a modification, a top plan hereinafter described.

The annulus-shaped carrying-frame A, formed of angle-iron, has stub-axles $a$ fixed thereto and projecting from opposite sides thereof forward of the transverse diametrical center of said frame, on which stub-axles the supporting-wheels $a'$ are journaled. The oblong rectangular-shaped rake or tedder-frame B extends diametrically across the frame A, which carries it, and when the hay elevator or loader C is not in place on the frame A the frame B is adjustable angularly thereon to bring it with the mechanism carried by it into position for use as a hay-tedder in scattering or tossing hay rearwardly, or at different angles rearwardly, to the line of travel of the machine and to bring it into position for use as a side-delivery hay-rake for use in raking and tossing hay forwardly at different angles obliquely to the line of travel of the machine. After such adjustments the frame B is fixed in position on the frame A by means of the bolts $a^2$.

The driving-shaft D extends diametrically across the frame A and is journaled at its end parts in standards $d$, which are fixed to said frame. One end of the shaft D carries a pinion $d'$, which is geared by a sprocket-chain $d^2$ with a larger drive-pinion $d^3$, fixed on the hub of a wheel $a'$. A bevel-pinion $d^4$ on the mid-length part of the shaft D, Fig. 4, gears with a bevel-pinion $e$ on the upper end of a short vertical shaft E, the lower end of which has a step-bearing in a plate $e'$ and carries a bevel-pinion $e^8$, which gears with a bevel-pinion $e^9$ on the multicrank shaft G.

The upper end part of the shaft E is journaled in a plate $e^2$, fixed on the upper ends of standards $e^3$, that are mounted on one of the transverse bars $b$ of the adjustable tedder-frame B. An annular plate $e^4$ is located on top of the plate $e^2$, and is held in place thereon by another plate, $e^5$, which is bolted to the plate $e^2$. A bearing $e^6$ for the shaft D is fixed to one side of the plate $e^4$.

The multicrank shaft G has bearings in the transverse bars $b$ of the frame B, and the hay-gathering or tedder forks $g$ are mounted on the several cranks $g'$ and have their upper ends severally connected pivotally by link-rods $g^2$ with short radius-arms $g^3$, which project from a rock-shaft $g^4$, that is journaled in bearings at one side of the frame B. A rod $g^5$ is pivotally connected at one end with one of the radius-arms $g^3$, and has a series of holes $g^6$ in its other end. The rod $g^5$ can be adjusted forwardly or rearwardly to cause the lower ends of the tedder-forks in the lower parts of their orbital movements to pass farther or less forwardly, as may be desired, and is fixed after such adjustments by placing one of the holes $g^6$ over a pin $g^7$, projecting from one of the standards $g^3$. A caster-wheel H supports the rear side of the frame A, and the branches $i$ of the rear end of the draft-pole I are pivotally connected with the lugs $i'$ to connect the draft-pole with the frame A.

In whatever position the frame B may be adjusted angularly with reference to the frame A the gear connection between the drive-shaft D and the multicrank shaft G will be effective in rotating said multicrank shaft, and thereby operating the forks $g$ in an ordinary manner by carrying that portion of them which is journaled to said crank-shaft around in circular paths and their lower end parts in orbital paths, in which paths the hay raking or gathering forks at their lower ends sweep rapidly over the surface of the ground and rapidly rise at an angle therefrom so as to throw the hay they have collected away from the forks and in an upwardly-inclined direction.

The combined hay tedder and rake hereinbefore described is substantially the same as that shown and described in Letters Patent No. 496,612, issued to me May 2, 1893, and hence need not be any more fully described herein. The adjustment of the frame B on the frame A, and thereby the adjustment of the multicrank shaft G at right angles to the line of travel of the machine, as shown in the drawings herewith, and whereby the forks $g$ will throw the hay upwardly and forward of themselves, is an adjustment which would not be operative as a hay-rake, or in any use in connection with the machine alone shown in my patent referred to. Such adjustment of the multicrank shaft is, however, thoroughly practical when a hay-elevator substantially such as herein shown and described is properly mounted in advance thereof to receive and take the hay away from in front of the gathering-forks as it is thrown forwardly thereby. When thus adjusted, the lower ends of the forks $g$ have an orbital movement independently of but in connection with the ordinary progressive movement of the entire machine in operation, by means of which orbital movements they will throw the hay with some force upwardly and forwardly.

The hay elevator and loader J consists of a platform or floor $j$ with sides $j'$, on which are mounted bearings $j^2$ for a crank-shaft K, having a series of cranks $k$ alternating with another series, $k'$, to which are hinged or journaled the hay-elevating bars $l\,l'$, respectively. The bars $l\,l'$ are each provided with downwardly-projecting teeth $l^2$ on their under sides. The upper ends of the bars $l\,l'$ are aligned properly in their movements, and while held high enough to prevent the teeth $l^2$ contacting with the platform or floor $j$ are still permitted to rise and fall to a limited extent by means of the transverse bar M, having notches or recesses $m$, in which guide-loops $m'$, that are fixed to the bars $l\,l'$, slide as said bars are alternately given endlong movements at their upper ends upwardly of the platform and alternate movements downwardly thereof by means of the multicrank shaft K. The hay-elevator shown and described is of an ordinary type or construction, except as hereinafter described, and hence need not be any more fully described herein.

The elevator J is mounted on the frame A in an upwardly-inclined position, substantially as shown at Fig. 2, and is fixed in such position by angle-plates N, Fig. 5, one side of each of which is bolted to the frame A, and the other side of which is bolted to the side $j'$ of the elevator. The elevator is further supported by a brace P, which is fixed at its lower end to a bracket $p$ projecting from the forward side of the frame A, and at its upper end is bolted to the platform or floor $j$. At Fig. 1 the multicrank shaft K is shown as geared with, to be driven by, the shaft D by means of a pinion $k^3$ on the outer end of the multicrank shaft K, which pinion $k^3$ gears with a pinion $k^4$ on a short shaft $k^5$, which projects from the side of the elevator, and has another pinion $k^6$ on its outer end, which gears with a pinion $k^7$ on the drive-shaft D by means of a sprocket-chain $k^8$. The sprocket-pinion $d'$ is loosely mounted on the shaft D and carries one member, $r$, of a clutch R, the other member, $r'$, of which is moved into and out of gear with the pinion $d'$ by means of a lever $r^2$, and which slides lengthwise of the shaft D, but rotates with it, in an ordinary manner for throwing the supporting-wheels into and out of gear with the drive-shaft, when desired.

The bars $l\,l'$ are located with reference to the platform or floor $j$ in such manner that the lower ends of said bars do not in their reciprocating movements extend to the lower end of the platform or floor. Hence when the elevator J is located on the frame A in front of the forks $g$, as herein shown and described, the lower end of the platform or floor will extend down to so near the ground, Fig. 2, that the forks $g$ will throw the hay onto said lower end and force it upwardly thereof to where it will be operated on by the toothed bars $l\,l'$ and be by them in an ordinary manner impelled upwardly of the elevator and be discharged onto a wagon or other receiver, which the rake and loader is made to closely follow by reason of its tongue I being hitched thereto in an ordinary manner.

By the means stated the hay can be cleanly raked or gathered from the swath or from windrows and be elevated as raked or gathered by the efficient hay-elevating bars $l\,l'$.

The hay-elevator being attached, as it is, to the frame A, it may be readily removed therefrom for the use of the remaining parts as a side-delivery hay-rake or as a hay-tedder.

In the modification shown at Fig. 6 the carrying frame A' is not annulus-shaped, but is of curved form at its forward side, and there is no frame B adjustably or otherwise mounted on the carrying-frame, and no drive-shaft D or gear connection of same with the multicrank shaft G. In this modification the multicrank shaft G is journaled in bearings on the frame A', and has a pinion $s$ which gears with a drive-pinion $s'$ fixed to the hub of one of the supporting-wheels $a'$. The forks $g$ are mounted on the multicrank shaft G in same manner and operate in same manner as hereinbefore described. The elevator J is the same, and is mounted on the carrying-frame in the same manner and in the same relation to the multicrank shaft and the forks $g$, as hereinbefore described. In this modification the multicrank shaft K is driven by gear connection with the multicrank shaft G by means of a sprocket-chain $t$, which gears with a sprocket-wheel $t'$ on the shaft G and with a sprocket-wheel $t^2$ on the shaft K.

In the modification, as in the other figures, the forks $g$ are held in upright working positions by the link-rods $g^2$, while their lower ends are carried around in an orbital path by means of the multicrank shaft G; and their lower fork-shaped ends, as they pass sidewise of themselves through the lower parts of their orbits, move at a much greater rate of speed than do the cranks which move them, and this rapid movement of their forked lower ends sidewise of themselves follows a slower movement and precedes a slower movement of the forks substantially endwise of themselves as they pass respectively through the rear part and through the front part of their orbits. This rapid movement of the lower ends of the forks forwardly through the lower parts of their orbits by its rapidity and suddenness has the effect of throwing the hay with considerable force forwardly and upwardly onto the lower end of the inclined platform and forcing it thereover to the action of the toothed hay-elevating bars, and hence has a new mode of operation, as an after-rake, in gathering the hay and delivering it to an elevator preceding it, and which is adapted for that purpose, and by means of which a new result is produced in raking or gathering hay and delivering it to an elevator of the type herein shown and described.

What I claim as new, and desire to secure by Letters Patent, is—

1. In combination in a hay rake and loader, a hay-elevator comprising toothed elevating-bars overlying an inclined platform or floor which extends below the lower ends of the elevating-bars in their lowest movements, and a multicrank shaft which reciprocates said elevating-bars, an after-rake or hay-gatherer having a multicrank shaft disposed at a right angle to the line of travel of the machine, and operated by gear connection with a supporting-wheel, and forks operated by said multicrank shaft while held in upright working positions by suitable mechanism, and their lower ends swept around in orbital paths to gather and throw the hay onto the lower end of said elevator and to force it upwardly thereover to the teeth of the elevator-bars, and gear connection between the multicrank shaft which operates the elevator-bars and a supporting-wheel, substantially as described.

2. In combination in a hay rake and loader, an elevator having toothed bars operated by a multicrank shaft which is rotated by a supporting-wheel and overlies an inclined platform or floor having its lower end extended downwardly below the lower ends of the toothed bars, an after-rake or hay-gatherer having a multicrank shaft disposed at a right angle to the line of travel of the machine, and operated by gear connection with the supporting-wheel as the elevator-bar, and forks operated by said crank-shaft while held in upright working positions by suitable mechanism and their lower ends swept around in orbital paths to gather and throw the hay onto and upwardly of the lower extended end of the platform or floor, substantially as described.

3. In combination in a hay rake and loader, an elevator having toothed bars operated by a multicrank shaft which is rotated by a supporting-wheel and which toothed bars overlie an inclined platform or floor having its lower end extended downwardly below the lower ends of said toothed bars, an after-rake or hay-gatherer, consisting of an annulus-shaped carrying-frame supported on wheels, a tedder-fork frame adjusted on said carrying-frame at a right angle to the line of travel of the machine, a multicrank shaft journaled in said tedder-frame and operated by gear connection with one of the supporting-wheels, and forks operated by said crank-shaft while held in upright working positions by suitable mechanism and their lower ends swept around in orbital paths to gather and throw the hay onto the lower extended end of the platform or floor, substantially as described.

In testimony whereof I affix my signature in presence of two witnesses.

JOHN KAYLOR.

Witnesses:
M. L. JOHNSON,
OLIVE FUNK.

It is hereby certified that in Letters Patent No. 556,353, granted March 17, 1896, upon the application of John Kaylor, of Decatur, Illinois, for an improvement in "Hay Rakes and Loaders," an error appears in the printed specification requiring correction as follows, viz: In line 21, page 1, the word "and" should read *an;* and that the said Letters Patent should be read with this correction therein that the same may conform to the record of the case in the Patent Office.

Signed, countersigned, and sealed this 31st day of March, A. D. 1896.

[SEAL.]

JNO. M. REYNOLDS,
*Assistant Secretary of the Interior.*

Countersigned:
S. T. FISHER,
*Acting Commissioner of Patents.*